US006447568B1

(12) United States Patent
Shiiba et al.

(10) Patent No.: US 6,447,568 B1
(45) Date of Patent: Sep. 10, 2002

(54) COMPOSTING ACCELERATOR

(75) Inventors: Kiwamu Shiiba; Ken Kanzaki; Kenzo Okada, all of Tsukuba (JP)

(73) Assignee: Nisshin Flour Milling Inc., Tokyo (JP)

( * ) Notice: Subject to any disclaimer, the term of this patent is extended or adjusted under 35 U.S.C. 154(b) by 0 days.

(21) Appl. No.: 09/599,446

(22) Filed: Jun. 22, 2000

(51) Int. Cl.$^7$ .................................................. C05F 11/08
(52) U.S. Cl. ........................... 71/6; 71/11; 71/8; 71/23; 71/24; 71/62
(58) Field of Search ................................ 71/11, 23, 62, 71/24, 8, 6

(56) References Cited

U.S. PATENT DOCUMENTS 5,549,890 A * 8/1996 Kubo ..................... 424/93.462

FOREIGN PATENT DOCUMENTS

| JP | 52154768 | * | 12/1977 |
| JP | 05301791 | * | 11/1993 |
| JP | 07082066 | * | 3/1995 |
| JP | 07232984 | * | 9/1995 |
| JP | 08109088 | * | 4/1996 |
| JP | 08198694 | * | 8/1996 |
| JP | 09012387 | * | 1/1997 |
| JP | 09048685 | * | 2/1997 |
| JP | 08118458 | * | 10/1997 |
| JP | P2000-154083 A | | 6/2000 |

OTHER PUBLICATIONS

Smith Et Al., Sci. Hortic., vol. 5(1) pp. 23–31, 1976.*

* cited by examiner

Primary Examiner—Chhaya D. Sayala
(74) Attorney, Agent, or Firm—Oblon, Spivak, McClelland, Maier & Neustadt, P.C.

(57) ABSTRACT

Provided are a composting accelerator which comprises a mixture obtained by mixing (A) an organic matter having an arabinoxylan content of 10 wt. % or greater and (B) heat-resistant bacteria for assimilating an organic material, and optionally a humic acid and has a pH adjusted within a range of from 6.0 to 8.5; a composting accelerator comprising a mixture obtained by mixing the above-described organic matter (A) and calcium silicate (C) at a weight ratio ranging from 50:50 to 95:5; and a process for producing an organic fertilizer by using each of the above-described composting accelerators.

12 Claims, No Drawings

COMPOSTING ACCELERATOR

TECHNICAL FIELD

The present invention relates to a composting accelerator; a process for producing, by using said composting accelerator, an organic fertilizer by composting a raw material to be composted; an organic fertilizer available by this process; and a method for spreading the composting accelerator on the floor of a livestock barn. More specifically, this invention pertains to a composting accelerator capable of composting an organic raw material to be composted, such as livestock excrement, food remnants, activated sludge and ligneous residues, while reducing an emission amount or emission time of ammonia, thereby producing a good-quality organic fertilizer having excellent fertilizing efficiency in a short period; a process for producing an organic fertilizer by using said composting accelerator; and a method for reducing a malodor such as ammonia odor by spreading said composting accelerator on the floor of a livestock barn.

Background Art

Although conventional, popularly-employed compound fertilizers are fast acting, they have caused problems such as poor growth or death due to a concentration disturbance, soil infertility due to continuous use, and environmental pollution. In recent years, therefore, a compost prepared by composting an organic raw material to be composted, for example, animal excrement such as fowl dung, swine dung or cattle dung, food remnants dumped from home or food plants, or activated sludge has been sprayed to the soil, whereby the above-described problems of the compound fertilizer can be overcome and plants can be reared while the soil fertility is reinforced. Although the above-described organic raw material to be composted can be composted singly without addition of any composting accelerator or composting auxiliary, composting does not proceed smoothly because of a large water content and poor air permeability. It is therefore common to carry out composting after mixing a raw material to be composted with a plant type organic matter such as sawdust, wheat straw, rice straw and/or fallen leaves, and adjusting the water content of the resulting mixture. It however takes time to decompose the plant type organic matter such as sawdust because it contains a sparingly decomposable component in a large amount. Composting of a raw material to be composted with the plant type organic matter incorporated therein is accompanied with the drawback that it takes long time (usually, 3 to 6 months) for composting the mixture and in some cases, the mixture becomes anaerobic during a long composting period, thereby emitting an offensive odor over a long period of time. In addition, a lignin component contained in the plant type organic matter is decomposed into a phenolic acidic substance, which happens to inhibit the growth of a plant.

Also known is a process for composting an organic raw material to be composted such as livestock excrement, food remnants or activated sludge after adjusting its C/N ratio, water content and pH by using a so-called "returned compost" which is a fully-composted compost returned to the raw material for further composting thereof, or a mineral such as vermiculite or diatomaceous earth. Compared with the above-described process wherein a plant-type organic matter is added, this process usually produces a good-quality compost, since it does not take so much time for composting and a phenolic acidic substance is formed in a reduced amount. It is however accompanied with the drawbacks that it takes not so long time but still takes 1 to 2 months for composting, adjustment of a C/N ratio, water content and pH of the raw material to be composted necessary for this process is cumbersome and requires much labor, and ammonia is emitted over a long period of time.

In addition, proposed is a process (Japanese Patent Publication No. Hei 5-73718) for composting an organic waste, by mixing the organic waste with artificial calcium particulate selected from tobermorite or xonotlite, compulsorily bringing the resulting mixture into contact with air to convert it into the composted material in half maturity, and naturally composting it into the composted material in full maturity. This process however requires forced composting by using a forced composting apparatus equipped with a porous plate or agitating blade for blowing the air into the mixture of the organic waste and artificial calcium silicate, so that it is complex in both step and apparatus and requires much labor and cost. In addition, artificial calcium silicate in an amount as large as 30 to 50 kg must usually be mixed with 100 kg of the organic waste for adjusting the water content of the resulting mixture to 50 to 60 wt. % upon composting, which makes a large burden in cost and labor. Moreover, artificial calcium silicate remains in the resulting compost without being decomposed and lowers a decreasing rate of the volume or weight of the organic waste, one of the important targets of the composting, whereby a smooth reduction in the amount of the organic waste is disturbed.

The organic raw material to be composted such as livestock excrement, food remnants or activated sludge has a large water content, and has an unstable pH due to various components mixed therein. The microorganism flora (microflora) contained in it therefore tends to become ill-balanced, which disturbs the proliferation of an effective microorganism group usefully acting on composting. Particularly in winter, composting of it does not proceed smoothly at a low atmospheric temperature and it requires a longer period for composting.

With the foregoing in view, the present inventors previously developed and proposed a composting accelerator comprising 100 parts by weight of an organic matter, such as wheat bran, having an arabinoxylan content of 20 wt. % or greater, 1 to 3 parts by weight of slaked lime, 3 to 10 parts by weight of a humic acid and 5 to 20 parts by weight of a microorganism material; and a process for producing an organic fertilizer by using the composting accelerator (Japanese Patent Application Laid-Open No. Hei 8-198694). Moreover, the present inventors developed and applied, for patent, a process for producing an organic fertilizer by adjusting the water content, pH and C/N ratio of a raw material to be composted which is composed of livestock excrement and/or activated sludge, to 55 to 65 wt. %, 70 to 8.5 and 20 or less, respectively, and adding, to 100 parts by weight of the thus-adjusted raw material, 25 to 50 parts by weight of a composting auxiliary composed of wheat bran, as a main component, slaked lime and the like, thereby composting the raw material (Japanese Patent Application Laid-Open No. Hei 9-48685).

The above-described inventions by the present inventors are advantageous in that the organic raw material to be composted, which has a large water content, such as livestock excrement, food remnants and activated sludge can be composted in a short time, compared with the conventional process. Based on these inventions, the present inventors have proceeded with an investigation. As a result, it has been found that there is a room for improvement in the former invention, because the pH of the composting accelerator becomes as high as 9 or greater, usually about 10 owing to a comparatively large amount of slaked lime in the composting accelerator, which induces emission of a large amount of ammonia causing a malodor. It has also been found that there is also a room for improvement in the latter invention because it needs extra time and cost for adjusting the water content, pH and C/N ratio of the organic raw material to be composted.

In a livestock barn wherein animals such as cattle, swine and horses are bred, an offensive odor due to their excrement is strong, which markedly deteriorates their breeding environment. With a view to suppressing the emission of a malodor, a microorganism material has conventionally been spread on the floor of a livestock barn. From the viewpoints of suppression of emission of an offensive odor and safety for livestock and persons working in the barn, however, a satisfactory solution for the above-described problem has not yet proposed.

An object of the present invention is therefore to provide a composting accelerator which can compost an organic waste matter such as livestock excrement from animals in a livestock barn, food remnants dumped from food industry or home, or activated sludge generated after aeration of the industrial waste in an oxidizing tank or generated from sewage treatment in a time shorter than that of the conventional accelerator while reducing an emission amount or period of ammonia compared with the conventional composting process, thereby converting it into a good-quality organic fertilizer having excellent fertilizing efficiency.

Another object of the present invention is to provide a process for composting a raw material to be composted such as livestock excrement, food remnants or activated sludge, while reducing an emission amount or period of ammonia, thereby producing, in a short time, an organic fertilizer having a high fertilizing efficiency.

A further object of the present invention is to provide a method for improving the breeding environment of livestock by effectively reducing an offensive odor emitted from its excrement in a barn while securing the safety for livestock or working person.

A still further object of the present invention is to provide a process for composting an organic waste matter such as livestock excrement discharged from animals in a livestock barn, food remnants dumped from food industry or home, or activated sludge generated after aeration of the industrial waste in an oxidizing tank or generated from sewage treatment in a short time by a simple step and operation without using any special apparatus for continuously bringing it into contact with the air, without adding slaked lime, and without conducting any special adjustment of the water content, pH and C/N ratio of the raw material to be composted, thereby converting it into a good-quality organic fertilizer having excellent fertilizing efficiency; and a composting accelerator for the process.

Disclosure of the Invention

With a view to attaining the above-descried objects, the present inventors have proceeded with an investigation. As a result, it has been found that a composting accelerator, which is available by adding heat-resistant bacteria for assimilating an organic material to an organic matter having an arabinoxylan content of 10 wt. % or greater and has pH adjusted to 6.0 to 8.5, is markedly effective for composting acceleration of an organic raw material to be composted, such as livestock excrement, food remnants or active sludge, having a high water content and that only by the addition of it to the raw material to be composted at a predetermined ratio, a good-quality organic fertilizer having excellent fertilizing efficacy can be produced very easily in a short time, while reducing the emission amount and period of ammonia, even without adjusting the water content, pH and C/N ratio of the raw material to be composted.

It has also been found that the spreading of the above-described composting accelerator on the floor of a livestock barn suppresses the emission of ammonia, which is a cause for offensive odor, and is extremely effective for the improvement of the breeding environment of livestock and that the accelerator is highly safe for animals and also persons working in the barn, because it does not contain any harmful component.

It has also been uncovered that when an organic matter having an arabinoxylan content of 10 wt. % or greater and calcium silicate are added, each at a specific ratio, to an organic raw material to be composted such as livestock excrement, food remnants, activated sludge or ligneous residues to compost the same, a good-quality organic fertilizer having excellent fertilizing efficacy is available by a markedly simple step and operation in a short time even without any special apparatus for bringing the raw material into constant contact with the air, without using slaked lime, or without any adjustment of the water content, pH and CN ratio of the raw material to be composted, leading to the completion of the present invention.

In the present invention, there is thus provided:

(1) a composting accelerator which comprises an organic matter having an arabinoxylan content of 10 wt. % or greater and heat-resistant bacteria for assimilating an organic material, and has a pH adjusted to 6.0 to 8.5.

The present invention embraces, as preferred embodiments,:

(2) the composting accelerator described above in (1) wherein the component (A) is wheat bran and/or low-grade flour powder, (3) the composting accelerator described above in (1) for (2), which contains the component (A) in an amount of 60 wt. % or greater based on the total weight of the composting accelerator, (4) the composting accelerator described above in any one of (1) to (3), wherein the heat resistant bacteria (B) is able to survive at 55° C. after treated at 80° C. for 10 minutes, (5) the composting accelerator described above in any one of (1) to (5), wherein the heat-resistant bacteria (B) are contained in an amount of $10^5$ CFU or greater per g of the composting accelerator, and (6) the composting accelerator described above in any one of (1) to (5), further comprising a humic acid in an amount of 2.5 wt. % or less based on the total weight of the composting accelerator.

(7) In another aspect of the present invention, there is also provided a process for producing an organic fertilizer, which comprises adding, to 100 parts by weight (in terms of a dry matter) of a raw material to be composted, the fertilizer described above in any one of (1) to (6) so that the amount of the wheat bran and/or low-grade flour powder in the composting accelerator will become 0.2 to 25 parts by weight (in terms of a dry matter), thereby composting the raw material.

(8) The present invention also provides an organic fertilizer available by the process described in (7).

(9) The present invention also provides a method for spreading the composting accelerator described above in any one of (1) to (6) on the floor of a livestock barn.

(10) The present invention also provides a method for spreading the organic fertilizer described above in (8) on the floor of a livestock barn.

In a further aspect of the present invention, there is also provided:

(11) a process for producing an organic fertilizer which comprises adding (A) an organic matter having an arabinoxylan content of 10 wt. % or greater and (C) calcium silicate to a raw material to be composted at a weight ratio of (A):(C) ranging from 50:50 to 95:5, thereby composting the raw material.

The present invention embraces, as a preferred embodiment,

(12) the process described above in (11), wherein the component (A) and the component (C) are added in a total amount of 0.5 to 20 parts by weight based on 100 parts by weight of the raw material to be composted.

In a still further aspect of the present invention, there is also provided:

(13) an organic fertilizer produced by the above-described process (11) or (12), and

(14) a composting accelerator comprising a mixture obtained by mixing (A) an organic matter having an arabinoxylan content of 10 wt. % or greater and (C) calcium silicate at a weight ratio of (A):(C) ranging from 50:50 to 95:5.

Any organic matter having an arabinoxylan content of 10 wt. % or greater can be used as the organic matter (A) in the present invention. That having an arabinoxylan content of 20 wt. % or greater is preferred. When an organic matter having an arabinoxylan content less than 10 wt. % is used, smooth composting of the raw material to be composted into the corresponding compost in a short time cannot be attained. Specific examples of the organic matter (A) used preferably in the present invention include wheat bran (an arabinoxylan content: usually about 25 to 40 wt. %), low-grade flour powder (ditto: about 15 to 25 wt. %), rice bran (ditto: about 20 to 45 wt. %), gluten feed (ditto: 20 to 40 wt. %), beer bran (ditto: about 20 to 40 wt. %) and corn husk (ditto: about 25 to 45 wt. %). They may be used either singly or in combination.

A description will next be made of the use of the organic substance (A) and heat-resistant bacteria (B) in combination (which will hereinafter be called "composting accelerator (AB)").

In the composting accelerator (AB), use of wheat bran and/or lower-grade flour powder as the organic matter (A) is preferred.

Wheat bran is, as you known, a protective seed coat of the wheat kernel, while low-grade flour powder contains the endosperm (wheat flour) attached to the protective seed coat of the wheat kernel and wheat bran. Each of them is available as a by-product in wheat milling. The wheat bran and low-grade flour powder each has higher proliferating action of an arabinoxylan decomposable microorganism than rice bran, gluten field or the like, because it is presumed that the wheat flour or low-grade flour powder has a C/N ratio of about 15, has a low water content (15 wt. % or lower) and has a shape which facilitates formation of voids when deposited.

The composting accelerator (AB) of the present invention may contain either one or both of the wheat bran and low-grade flour powder.

It is preferred that the composting accelerator (AB) of the present invention contains wheat bran and/or low-grade flour powder in an amount of 60 wt. % or greater (total amount when both of the wheat bran and low-grade flour powder are incorporated) based on the total weight of the composting accelerator, with 80 wt. % or greater being more preferred. Contents of the wheat bran and/or low-grade flour powder less than 60 wt. % make it difficult to prepare a composting accelerator having excellent composting accelerating effects and ammonia emission inhibitory effects.

The composting accelerator (AB) of the present invention further contains heat-resistant bacteria for assimilating an organic material.

As the heat-resistant bacteria, those capable of assimilating the above-described organic matter composed mainly of wheat bran and/or low-grade flour powder or organic raw material to be composted and surviving at 55° C. even after treated at 80° C. for 10 minutes. Examples of such heat-resistant bacteria include microorganisms belonging to the genus Bacillus such as *Bacillus subtilis, Bacillus cereus, Bacillus coagulans* and *Bacillus stearothermophilus*, thermophylic genus Actinomyces such as *Thermoactinomyces vulgaris* and *Thermomonospora curvara* and thermophylic mold such as *Humicola insokens* and *Talaromyces dupontii*. The composting accelerator (AB) according to the present invention can contain at least one of these heat-resistant bacteria. As the-heat-resistant bacteria for the composting accelerator (AB) of the present invention, commercially available one as a microorganism preparation may be used as is, or in some cases, the above-described heat-resistant bacteria may be used after culturing and proliferation. Many of these heat-resistant bacteria has high capacity of degrading wheat bran or low-grade flour powder and at the same time, has excellent capacity of decomposing an organic waste matter at high temperatures.

Since the composting accelerator (AB) of the present invention is capable of efficiently composting a raw material to be composted such as livestock excrement, food remnants or activated sludge while suppressing the emission of ammonia, thereby converting it into a good-quality organic fertilizer excellent in fertilizing efficiency in a short time and in addition, it is capable of effectively suppressing the emission of ammonia when spread on the floor of a livestock barn, it preferably contains the above-described heat-resistant bacteria in an amount of $10^5$ CFU (colony forming unit) or greater per g of it, with an amount of $10^6$ CFU or greater being more preferred.

The CFU of the heat-resistant bacteria in the present invention means the number of colonies formed when the composting accelerator is cultured on a standard agar medium for 48 hours in a thermostat of 55° C., which will be described more specifically later in Examples.

The composting accelerator (AB) of the present invention is required to have a pH adjusted within a range of from 6.0 to 8.5, with a range of from 7.0 to 8.0 being more preferred. When the composting accelerator (AB) has pH less than 6.0, such a low pH prevents the heat-resistant bacteria from exhibiting sufficient activity upon production of an organic fertilizer by mixing the composting accelerator (AB) with a raw material to be composted so that an organic fertilizer of good quality cannot be produced in a short time and in addition, upon production of the organic fertilizer or spreading to a livestock barn, it has only low inhibitory action against the emission of ammonia and does not exhibit sufficient offensive odor preventive effects. When the pH of the composting accelerator (AB) is greater than 8.5, on the other hand, it induces an increase in the emission amount or period of ammonia upon production of an organic fertilizer by mixing of the composting accelerator (AB) with a raw material to be composted, leading to a deterioration in the production environment of the organic, fertilizer due to an offensive odor, which prevents the production of an organic fertilizer of good quality in a short time. In addition, the spreading of the composting accelerator having a pH exceeding 8.5 to a livestock barn causes a deterioration in its environment by an increase in the emission amount or period of ammonia.

Wheat bran or low-grade flour powder generally has a pH of about 6.5 so that the composting accelerator (AB) of the present invention having a pH of about 6.5 can be produced easily by mixing the wheat bran and/or low-grade flour powder with the above-described heat resistant bacteria. The pH of the composting accelerator (AB) of the present invention can be made greater than 6.5 but not greater than 8.5 (when the pH is adjusted to a particularly preferable range of from 7.0 to 8.0) only by adding an isalkaline substance in an amount enough for providing a predetermined pH value. Any alkaline substance can be used for the above-described purpose insofar as it does not have toxicity. For example, lime and slaked lime which are relatively strong alkaline, and calcium carbonate and aluminum oxide powder (ALC powder) which are weak alkaline are preferred from the viewpoints of easy pH adjustment of the composting accelerator (AB) within the above-described range and low cost. It should however be noted that when the alkaline substance is added in excess, the pH of the composting accelerator (AB) exceeds 8.5 and the target composting accelerator does not become available. Upon addition, a weakly alkaline one is preferred, because it is difficult to adjust the pH of the relatively strong alkaline substance, such as lime, added in only a small amount and it sometimes reacts with another substance.

The composting accelerator (AB) of the present invention preferably contains a humic acid in an amount not greater than 2.5 wt. % based on the total weight of the 5 composting accelerator, with an amount of 1.0 to 2.0 wt. % being more preferred. The composting accelerator (AB) containing a humic acid in the above-described amount is able to accelerate proliferation of a microorganism useful for the composting of a raw material to be composted such as livestock excrement, food remnants or activated sludge, or livestock excrement in a livestock barn, which makes it possible to produce, in a short time, an organic fertilizer having a high fertilizing efficiency and at the same time, to suppress an emission amount or period of ammonia upon production of the organic fertilizer or spreading of the composting accelerator of the present invention to a livestock barn. When the amount of the humic acid contained in the composting accelerator (AB) exceeds 2.5 wt. %, the organic fertilizer available by adding the composting accelerator (AB) to the raw material to be composted, thereby composting the latter tends to have reduced fertilizing efficiency.

Examples of the humic acid include alkali-soluble, amorphous polymeric organic acids contained in the young coal such as lignite or peat having a low coalification degree, and nitrohumic acids available by oxidative destruction of the amorphous polymeric organic acid with nitric acid and salts of the nitrohumic acids. For the composting accelerator (AB) of the present invention, a substance containing a humic acid, for example, young coal such as peat or lignite may be used instead of the humic acid. Rather than use of a young coal such as peat or lignite, use of a humic acid separated therefrom or nitrohumic acid or salt thereof is preferred, because in the latter case, small-amount addition is sufficient for proliferation of a microorganism useful for composting.

The composting accelerator (AB) of the present invention may contain another component as needed in an amount of 40 wt. % or less, preferably 20 wt. % or less insofar as it has a pH maintained within a range of 6.0 to 8.5. Examples include minerals such as vermiculite, pearlite, zeolite and diatomaceous earth; and organic materials, other than wheat bran or low-grade flour powder, such as rice bran, corn husk, sawdust and bark.

There is no particular limitation imposed on the production process of the composting accelerator (AB) of the present invention insofar as it permits uniform mixing of wheat bran and/or low-grade flour powder and heat-resistant bacteria for assimilating an organic material, and optionally a humic acid and/or another component. It can be produced easily only by mixing the above-described components at room temperature. The resulting mixture can also be formed into pellets.

Upon production of an organic fertilizer by using the composting accelerator (AB) of the present invention, it is necessary to add it in such an amount that the amount of wheat bran and/or low-grade flour powder will fall within a range of from 0.2 to 25 parts by weight (in terms of a dry matter), preferably a range of from 1.0 to 20 parts by weight (in terms of a dry matter) (in total when both the wheat bran and low-grade flour powder are contained) based on 100 parts by weight (in terms of a dry matter) of a raw material to be composted.

When the amount of the composting accelerator (AB) does not satisfy the above-described range, that is, less than 0.2 part by weight or exceeding 25 parts by weight in terms of the amount of wheat bran and/or low-grade flour powder, the composting of the raw material to be composted is not accelerated, a long period of time must be spent for composting and an increase in the emission amount or period of ammonia occurs.

There is no particular limitation imposed on the nature of the raw material to be composted upon production of an organic fertilizer by using the composting accelerator (AB) of the present invention insofar as it is a raw material for an organic fertilizer which can be composted. Examples include livestock excrement, food remnants, activated sludge and ligneous residues. The composting accelerator according to the present invention is particularly effective for the composting of an organic waste matter such as livestock excrement, food remnants or activated sludge which has been regarded as a matter difficult to treat because of a high water content and a large amount of a malodor.

There is no particular limitation imposed on the composting conditions upon production of an organic fertilizer. It is possible to produce an organic fertilizer having high fertilizing efficiency and excellent quality smoothly in a short time (usually, about 15 to 20 days), while reducing an emission amount or period of ammonia, by adding the composting accelerator (AB) to the raw material to be composted in the above-described amount, uniformly mixing them, and composting the resulting mixture while keeping aerobic conditions by intermittent stirring (cutting and mixing). The above-described stirring about once a week is usually sufficient for the production of the organic fertilizer.

Since the emission amount of ammonia lowers markedly when the content of ammonia in the composted material becomes 50 ppm or less, it is recommended to terminate the composting at the time when the content of ammonia in the composted material becomes 50 ppm or less. The composted material (organic fertilizer) having an ammonia content not greater than 50 ppm has markedly high fertilizing efficiency for plants. For example, use of such a material heightens the growth degree of *Brassica Rapa var. pervidis.* (a kind of Chinese cabbage) to 4 or greater, which will be described later in Examples.

The organic fertilizer available by the above-described composting has a reduced offensive or foreign odor, the decomposition of a large portion of the raw material to be composted has proceeded well and it is in the fine granular form so that it is excellent in handling properties and is useful as a fertilizer for vegetables, cereal grain plants typified by rice or wheat, or plants such as flouring plants, fruit trees or trees. In some cases, this organic fertilizer can be spread on the floor of a livestock barn and reused as a bedding material, which brings about a cost reduction of the bedding material.

The composting accelerator (AB) of the present invention may be spread on the floor of a livestock barn in a conventional manner without using any extra spreader or spreading method. Since the composting accelerator (AB) of the present invention is free of any harmful substance and is therefore excellent in safety, it may be spread on the floor of a livestock barn irrespective of the presence of animals in the livestock barn. Although the amount of the composting accelerator (AB) to be spread depends on the amount of the excrement and bedding material such as straw or sawdust in the livestock barn, it is preferably spread in an amount so that the amount of the wheat bran and/or low-grade flour powder in the composting accelerator will become 0.2 to 25 parts by weight (in terms of a dry matter) (in a total amount when both of the wheat bran and low-grade flour powder are contained) based on 100 parts by weight in total of the organic matters such as excrement and bedding material in the livestock barn. Spreading of the composting accelerator (AB) reduces emission of ammonia, thereby reducing an offensive odor in a livestock barn, whereby the environment in the livestock barn can be improved.

A description will next be made of a composting accelerator having the organic matter (A) and calcium silicate (C) used in combination (which accelerator will hereinafter be called "composting accelerator (AC)".

In the present invention, preferably used as calcium silicate (C) is porous calcium silicate available by mixing a siliceous raw material such as silica with a calcareous raw material such as lime or cement to prepare an aqueous slurry and then curing the resulting aqueous slurry with high-pressure and high-temperature steam. Examples of such porous calcium silicate include powdery ALC (light-weight aggregate concrete), tobermorite and xonotlite. In the present invention, these calcium silicates may be used either singly or in combination.

Upon composting of a raw material to be composted, it is necessary to use an organic matter (A) having an arabinoxylan content of 10 wt. % or greater and calcium silicate (C) at a weight ratio of (A):(C) ranging form 50:50 to 95:5, preferably from 60:40 to 80:20.

When the using amount of the organic matter (A) is less than 50 wt. % [in other words, the using amount of calcium silicate (C) exceeds 50 wt. %], or exceeds 95 wt. % [in other words, using amount of calcium silicate (C) is less than 5 wt. %], each based on the total weight of the organic matter (A) and calcium silicate (C), the composting temperature does not reach the temperature (usually, 30 to 50° C.) effective for composting of the raw material to be composted, resulting in difficulty in composting or it takes long time for composting.

Insofar as the organic matter (A) and calcium silicate (C) are used at a weight ratio within the above-described range of from 50:50 to 95:5, composting may be conducted by either one of the following processes:

(i) a composting process which comprises mixing the organic matter (A) with calcium silicate (C) at the above-described ratio in advance to prepare a pre-mixture, adding the resulting pre-mixture to a raw material to be composted and then mixing these components uniformly; and (ii) a composting process which comprises seperately adding the organic matter (A) and calcium silicate (C) to a raw material to be composted and then mixing these components thoroughly.

The 50:50 to 95:5 pre-mixture of the organic matter (A) and calcium silicate (C) employed in the above-described process (i) can be stored or put on the market as a composting accelerator as is. Only by adding this pre-mixture, which serves as a composting accelerator (AC), to a raw material to be composted such as livestock excrement, food remnants, activated sludge or ligneous residues and mixing them uniformly, composting proceeds smoothly, whereby the raw material to be composted is composted in a short time and an organic fertilizer having excellent fertilizing efficiency can be prepared very easily in a short time.

Upon composting of the raw material to be composted, the organic matter (A) and calcium silicate (C) are added in a total amount of 0.5 to 20 parts by weight, preferably 5 to 10 parts by weight, based on 100 parts by weight of the raw material to be composted (which has not been subjected to an extra drying treatment and therefore still contains water). With regards to the dry weight of the raw material to be composted, the organic matter (A) and calcium silicate (C) are preferably added in a total amount of 1 to 100 parts by weight, more preferably 5 to 20 parts by weight, each based on 100 parts by weight of the raw material to be composted (in terms of a dry matter).

There is no particular limitation imposed on the composting conditions upon production of an organic fertilizer. An organic fertilizer having excellent fertilizing efficiency and high quality can be produced smoothly in a short time (usually, about 15 to 30 days) by uniformly adding the organic matter (A) and calcium silicate (C) to a raw material to be composted in the above-described weight ratio, uniformly mixing them, and composting the resulting mixture while keeping aerobic conditions by intermittent stirring (cutting and mixing). The above-described stirring (cutting and mixing) about once in 5 to 7 days is sufficient for the production of the organic fertilizer.

Since the organic fertilizer available by the above-described composting has a reduced offensive or foreign odor, composting of a large portion of the raw material to be composted has proceeded well and it is in the fine granular form, it is excellent in handling properties and is useful as a fertilizer for vegetables, cereal grain plants typified by rice or wheat, or plants such as flouring plants, fruit trees or trees.

EXAMPLES

The present invention will hereinafter be described more specifically by Examples. It should however be borne in mind that the present invention is not limited to or by them. Measurement of the viable count of heat-resistant bacteria in a composting accelerator, an ammonia content in the composted material, the maximum temperature and time required for attaining the maximum temperature upon composting (upon production of an organic fertilizer), and a water content in both a raw material to be composted and the organic fertilizer produced, and evaluation of the growth degree of *Brassica Rapa var. pervidis.* were conducted as described below. The pH of the composting accelerator was measured rightly after the components for the production of a composting accelerator were mixed.

[Measurement of the Viable Count of Heat-resistant Bacteria in a Composting Accelerator]

A composting accelerator sample (1 g) was diluted with 9 ml of sterilized water, followed by dilution, depending on the viable count (plate dilution method). After the mixture was kept at 80° C. for 10 minutes, it was smeared on a standard agar medium ("Pearl Core", produced by Eiken Chemical Co., Ltd.) and cultured in a thermostat of 55° C. for 2 days. The number of the colonies on the medium was counted, whereby the viable count of heat-resistant bacteria per g of the composting accelerator was determined.

[Measurement of an Ammonia Content in the Composted Material]

Distilled water (15 ml) was added to 1 g of a composted material sample. After the resulting mxiture was shaken for 30 minutes in a shaker, the amount of ammonia eluted into water was measured as an ammonia content in 1 g of the composted material sample by a simple water quality control set (simple water-quality checking kit, produced by Kyoritsu).

[Measurement of the Maximum Temperature and Time Required for Attaining the Maximum Temperature upon Composting (Upon Production of an Organic Fertilizer)]

Upon composting, a temperature sensor was inserted in 20 cm downward from the surface of a deposit layer and a time-dependent change of the temperature was measured by a temperature recorder ("Temperature Collector AM7002", manufactured by Anritsu Meter Co., Ltd.), whereby the maximum temperature and the time required for attaining the maximum temperature ( time required for attaining the maximum temperature from initiation of composting) were determined.

[Measurement of the Water Content Each of a Raw Material to be Composted and an Organic Fertilizer]

About 5 g of a raw material to be composted or an organic fertilizer obtained by using it was weighed in an aluminum can for measurement of a water content and dried for 2 hours at 135° C. A water loss by drying was measured as a water content.

[Evaluation of the growth degree of *Brassica Rapa var. Pervidis.*]

The growth degree of *Brassica Rapa var. pervidis.* was evaluated by carrying out a growth test of it by using organic fertilizers each obtained in the test number of the below-described Example.

Described specifically, water (30 ml) was added to 1 g organic fertilizer. After stirring, the mixture was allowed to stand at 60° C. for 3 hours. Then, 2 ml of the filtrate obtained by filtration of the mixture through a filter paper (Toyo Filter No. 5) was charged in a Petri dish having two filter papers (Toyo Filter Paper No. 2) laid on its bottom. About 30 seeds of *Brassica Rapa Var. pervidis* were sown and cultured in a thermostat of 25° C. for 4 days. Evaluation of the growth rate of *Brassica Rapa var. pervidis.* was conducted by a panel of 5 experts in accordance with the evaluation standards shown in Table 1 and was indicated by the average of the scores given by 5 experts.

TABLE 1

| Scores | Condition of leaf | Leaf color | Condition of taproot | Condition of hairy root |
|---|---|---|---|---|
| 5 (qualified) | A cotyledon has opened. | Green | It has grown to be 2 to 3 cm long. | It has grown densely. |
| 4 (qualified) | A cotyledon has opened. | Yellow to yellowish green | It has grown to be 1 to 2 cm. | It has grown not so densely. |
| 3 (not qualified) | A cotyledon has not yet opened but appears from a seed shell. | Yellow | It has a length of 0.5 to 1 cm. | It has slightly appeared. |
| 2 (not qualified) | A cotyledon has appeared a little from the seed shell. | Yellow | It has a length of 0.2 to 0.5 cm. | It has hardly appeared. |
| 1 (not qualified) | No cotyledon appears from the seed shell. | — | It has a length of 0.2 cm or less. | It has not appeared. |

Note) An organic fertilizer ranked as 4 or greater is regarded to be qualified.

Example 1

[Production of a Composting Accelerator]

Wheat bran, a microorganism material ("BST-9", produced by Takeda Kagaku Shiryo Co., Ltd.; containing heat resistant bacteria such as *Bacillus subtills* for assimilating an organic material in an amount of $1 \times 10^8$ CFU per g of the microorganism material), a nitrohumic acid ("NHA" produced by TELNITE Co., Ltd.), slaked lime and sawdust were mixed at a ratio as shown in Table 2 at normal temperature, whereby composting accelerators (i) to (ix) as shown in Table 2 were produced.

The number of colonies and pH at the time when each of the composting accelerators was cultured on a standard agar medium in a thermostat of 55° C. were as shown in Table 2.

Example 2

[Production of an Organic Fertilizer and Evaluation of the Growth Degree of *Brassica Rapa var. pervidis.*]

(1) To 10 kg of fowl dung was added 100 g of each of the composting accelerators (i) to (ix) obtained in Example 1, followed by thorough mixing. The resulting mixture was charged in a Styrofoam container (to give a thickness of about 35 cm) and stirred once a week to compost it, whereby an organic fertilizer was produced.

(2) During production of the fertilizer described above in (1), an ammonia content, temperature and weight of the composted material were measured with the passage of time and at the same time, the viable count of the heat-resistant bacteria (*Bacillus subtilis*) in the composted material on Day 7 after composting was measured. The results are as shown in Table 3.

(3) The growth degree of *Brassica Rapa var. Pervidis.* when each of the organic fertilizers obtained above in (1) was used was evaluated in accordance with the above-described method. The results are as shown in Table 3.

TABLE 2

Composition of composting accelerator (weight ratio)

| No. of composting accelerator | Wheat bran | Sawdust | Microorganism material (the number of heat-resistant bacteria[1]) | Nitrohumic acid | Slaked lime | Composting accelerator pH |
|---|---|---|---|---|---|---|
| (i) | 1000 | 0 | 0 ($10^3$ CFU) | 0 | 0 | 6.3 |
| (ii) | 1000 | 0 | 0 ($10^6$ CFU) | 30 | 0 | 5.5 |
| (iii) | 1000 | 0 | 0 ($10^3$ CFU) | 10 | 10 | 8.5 |
| (iv) | 1000 | 0 | 0 ($10^8$ CFU) | 10 | 10 | 8.5 |
| (v) | 1000 | 0 | 0 ($10^6$ CFU) | 10 | 0 | 6.0 |
| (vi) | 1000 | 0 | 0 ($10^6$ CFU) | 0 | 8 | 8.5 |
| (vii) | 1000 | 0 | 0 ($10^6$ CFU) | 0 | 12 | 10.0 |
| (viii) | 0 | 1000 | 0 ($10^6$ CFU) | 10 | 10 | 8.3 |
| (ix) | 0 | 1000 | 0 ($10^3$ CFU) | 0 | 0 | 5.8 |

[1] The viable count (CFU) of the heat-resistant bacteria (genus Bacillus) contained in 1 g of a composting accelerator when the composting accelerator is cultured on a standard agar medium for 48 hours in a thermostat of 55° C.

TABLE 3

| Test No. | Number of composting accelerator | Days required for ammonia to reach to 50 ppm or less (amount of ammonia on Day 30) | Maximum temperature (° C.) | Viable count of heat-resistant bacteria belonging to the genus Bacillus on Day 7 after composting (CFU/1 g of composted materials) | Growth degree of Brassica Rapa var. pervidis. (Day 30) |
|---|---|---|---|---|---|
| 1 | (i) | >Day 30 (173 ppm) | 50 | $1 \times 10^6$ | 2.0 |
| 2 | (ii) | >Day 30 (150 ppm) | 48 | $2 \times 10^6$ | 1.5 |
| 3 | (iii) | >Day 30 (283 ppm) | 52 | $6 \times 10^6$ | 3.0 |
| 4 | (iv) | 11 days (22 ppm) | 64 | $2 \times 10^6$ | 4.5 |
| 5 | (v) | 18 days (18 ppm) | 60 | $8 \times 10^6$ | 4.0 |
| 6 | (vi) | 22 days (35 ppm) | 58 | $2 \times 10^6$ | 4.0 |
| 7 | (vii) | >Day 30 (86 ppm) | 55 | $1 \times 10^6$ | 3.5 |
| 8 | (viii) | >Day 30 (125 ppm) | 45 | $<10^6$ | 1.0 |
| 9 | (ix) | >Day 30 (81 ppm) | 45 | $1 \times 10^6$ | 2.5 |

From the above-described results in Tables 2 and 3, it has been found that in the organic fertilizers of Test Nos. 4 to 6 produced using the composting accelerators (iv) to (vi) each of which contained wheat bran and heat-resistant bacteria for assimilating an organic material, and optionally nitrohumic acid, and had a pH adjusted within a range of from 6.0 to 8.5, an emission amount of ammonia was small and emission time was short upon production of the organic fertilizer, indicating that the organic fertilizer can be produced in a short time while preventing the emission of an offensive odor. It has also been found that when the organic fertilizers obtained in Tests 4 to 6 were applied, Brassica Rapa var. Pervidis. exhibited a growth degree as high as 4.0 or greater so that they are excellent in fertilizing efficiency.

It has been found that in the organic fertilizers of Test Nos. 2 and 7 produced using the composting accelerators (ii) and (vii), respectively, each of which contained wheat bran and a heat-resistant bacteria for assimilating an organic material but had a pH outside the range of from 6.0 to 8.5, on the other hand, an emission amount of ammonia was large and emission time of ammonia was long upon production of the organic fertilizer, which deteriorates the composting environment, thereby extending the time required for composting. It has also been found that when the organic fertilizers obtained in Test Nos. 2 and 7 were applied, Brassica Rapa var. Pervidis. exhibited a low growth degree, indicating that they are inferior to the organic fertilizers obtained in Test Nos. 4 to 6 also in fertilizing efficiency.

It has been found that in the organic fertilizers of Test Nos. 1, 3, 8 and 9 prepared using the composting accelerators (i), (iii), (viii) and (ix), respectively, said accelerators (i) and (iii) each containing wheat bran but not heat-resistant bacteria and having a pH adjusted within a range of from 6.0 to 8.5 and said accelerators (viii) and (ix) each containing not wheat bran but sawdust, an emission amount of ammonia was large and emission time of ammonia was long upon production of the organic fertilizer, leading to a deterioration in the composting environment and requirement for a long period for the production of the organic fertilizer.

Example 3

[Production of an Organic Fertilizer and Evaluation of the Growth Degree of Brassica Rapa var. pervidis.]

(1) An organic fertilizer was produced by mixing the composting accelerator (iv) produced in Example 1 with a swine raw dung/sawdust mixture (mixed at a weight ratio of 6:4, water content of the mixture: 65 wt. %) at a weight ratio as shown in the below-described Table 4, charging the resulting mixture in a Styrofoam container (to give a thickness of about 35 cm), and stirring about once a week for composting. (2) During the production (composting) of the organic fertilizer described above in (1), the ammonia content, temperature and weight of the composted material were measured with the passage of time and also the viable count of the heat-resistant bacteria (*Bacillus subtilis*) in the composted material on Day 7 after composting was measured. The results are as shown in the below-described Table 4.

bacteria belonging to the genus Bacillus in an amount of $1 \times 10^8$ CFU and $1 \times 10^9$ CFU, respectively, per 1 g of it.

(2) Composting accelerators (x) to (xv) as shown in Table 5 were produced by mixing wheat bran, the microorganism material prepared in (1), nitrohumic acid ("NHA", produced by TELNITE Co., Ltd.) and, as a pH regulator, slaked lime, calcium carbonate and/or aluminum oxide powder (ALC powder, "Escarew", produced by Onoda ALC Industry Co., Ltd.) at room temperature at the ratio as shown below in Table 5.

TABLE 4

| Test No. | Swine raw dung composting accelerator (weight ratio in terms of a dry matter) | Days required for ammonia to reach 50 ppm or less) | The maximum temperature (° C.) | Viable count of the heat-resistant Bacillus on Day 7 after composting | Growth rate of *Brassica Rapa* var. *Pervidis*. (on Day 30) |
|---|---|---|---|---|---|
| 10 | 100:0.1 | >30 days | 45 | $2 \times 10^5$ | 2.0 |
| 11 | 100:0.2 | 16 days | 59 | $5 \times 10^8$ | 4.0 |
| 12 | 100:10 | 15 days | 65 | $8 \times 10^8$ | 4.5 |
| 13 | 100:25 | 28 days | 61 | $1 \times 10^8$ | 4.0 |
| 14 | 100:30 | >30 days | 38 | $1 \times 10^8$ | 2.5 |

From the above-described results in Table 4, it has been found that in the organic fertilizers of Test Nos. 11 to 13 produced by adding, to 100 parts by weight (in terms of a dry matter) of a raw material to be composted (swine raw dung/sawdust mixture), the composting accelerator of the present invention [composting accelerator (iv)] in an amount so as to make the amount of wheat bran in the composting accelerator 0.2 to 25 parts by weight (in terms of a dry matter), thereby composting the raw material, an emission amount of ammonia was small and emission period of ammonia was short upon production of the organic fertilizer, indicating that the organic fertilizer can be produced in a short time. It has also been found that when the organic fertilizers obtained in Tests 11 to 13 were used, *Brassica Rapa* var. *Pervidis*. exhibited a growth degree as high as 4.0 or greater, indicating that these fertilizers are excellent in fertilizing efficiency.

Example 4
[Production of a composting accelerator]

(1) A heat-resistant-bacteria-containing microorganism material was prepared by adding *Thermoactinomyces vulgaris*, which were heat-resistant bacteria having an assimilating capacity of an organic material, and thermophylic bacteria belonging to the genus Bacillus to wheat bran and composting the same. The microorganism material contained *Therrmoactinomiyces vulgaris* and thermophylic The number of colonies and pH at the time when each of the composting accelerators was cultured on a standard agar medium in a thermostat of 55° C. for 48 hours are as shown in Table.

Example 5
[Production of an Organic Fertilizer and Evaluation of a Growth Degree of *Brassica Repa var. Pervidis*.]

(1) An organic fertilizer was produced by mixing 200 kg of each of the composting accelerators (x) to (xv) produced in Example 4 with 10 tons of a 1:2 (weight ratio) mixture of bark and activated sludge (water content of the mixture: 55 wt. %), depositing the resulting mixture on a concrete-made plane to form a circular cone having a height of about 2 m, allowing it to stand in a mountain, stirring it once a week, thereby composting it.

(2) The ammonia content, temperature and weight of the composted material was measured with the passage of time during the production (composting) of the organic fertilizer described above in (1). In addition, the viable count of the heat-resistant bacteria (*Bacillus subtilis*) in the composted material on Day 7 after composting was measured. The results are as shown in Table 6.

(3) The growth degree of *Brassica Rapa var. Pervidis*. to which the organic fertilizer obtained above in (1) was applied was evaluated in accordance with the above-described method. The results are as shown in Table 6.

TABLE 5

| | Composition (wt. %) of composting accelerator | | | | | |
|---|---|---|---|---|---|---|
| No. of composting accelerator | Wheat bran | Microorganism material (viable count of heat-resistant bacteria[1]) | Nitrohumic acid (relative to wheat bran wt. %) | pH regulator Kind | Amount | Composting accelerator pH |
| (x) | 60.5 | 1 ($2 \times 10^6$ CFU) | 1.5 (2.5) | ALC powder | 37 | 8.5 |
| (xi) | 60.5 | 1 ($2 \times 10^6$ CFU) | 1.5 (2.5) | Calcium carbonate | 37 | 8.1 |
| (xii) | 90.0 | 1 ($2 \times 10^6$ CFU) | 1.0 (1.1) | ALC powder | 8 | 7.0 |
| (xiii) | 60.0 | 1 | 1.5 (2.5) | Slaked lime | 1 | 8.9 |

TABLE 5-continued

| | | Composition (wt. %) of composting accelerator | | | | |
|---|---|---|---|---|---|---|
| No. of composting accelerator | Wheat bran | Microorganism material (viable count of heat-resistant bacteria[1]) | Nitrohumic acid (relative to wheat bran) wt. % | pH regulator Kind | Amount | Composting accelerator pH |
| (xiv) | 60.0 | (2 × 10⁶ CFU) 1 (2 × 10⁶ CFU) | 39.0 (65) | Calcium carbonate — | 35 0 | 5.1 |
| (xv) | 100.0 | 5 (10⁷ CFU) | 1.0 (1.0) | Slaked lime | 1 | 8.5 |

[1]The viable count (CFU) of heat-resistant bacteria (belonging to the genus Bacillus) contained in 1 g of a composting accelerator when the accelerator is cultured on a standard agar medium in a thermostat of 55° C. for 48 hours.

TABLE 6

| Test No. | No. of composting accelerator | Days required for ammonia to reach 50 ppm or less | Growth degree of Brassica Rapa var. Pervidis. (on Day 30) |
|---|---|---|---|
| 15 | (x) | on Day 21 | 4.0 |
| 16 | (xi) | on Day 18 | 4.0 |
| 17 | (xii) | on Day 14 | 4.5 |
| 18 | (xiii) | >Day 30 (ammonia concentration on Day 30: 107 ppm) | 2.5 |
| 19 | (xiv) | >Day 30 (ammonia concentration on Day 30: 232 ppm) | 2.0 |
| 20 | (xv) | >Day 30 (ammonia concentration on Day 30: 89 ppm) | 3.5 |

From the above-described results in Tables 5 and 6, it has been found that in the organic fertilizers of Test Nos. 15 to 17 produced using the composting accelerators (x) to (xii), respectively, each of which contained wheat bran, heat-resistant bacteria for assimilating an organic material and nitrohumic acid and had a pH adjusted within a range of from 6.0 to 8.5, it was possible to produce an organic fertilizer smoothly in a short composting period while reducing an emission amount and period of ammonia. It has also been found that when each of the organic fertilizers obtained in Test Nos. 14 to 16 was applied, Brassica Rapa var. Pervidis. exhibited a growth degree of 4.0 or greater, indicating that it is excellent in fertilizing efficiency.

Example 6

(1) As organic matters to be added to a raw material to be composted (fowl raw dung), wheat bran (having an arabinoxylan content of 28 wt. %), wheat low-grade flour (ditto: 14 wt. %), corn husk (ditto: 27 wt. %) and sawdust (ditto: 0 wt. %) were provided, while as calcium silicate, artificial calcium silicate powder "Escarew" (trade name) produced by Onoda ALC was provided.

(2) The fowl raw dung (having a water content of 65 wt. %) (12 kg) was composted by adding thereto wheat bran, wheat low-grade flour powder, corn husk, sawdust and/or calcium silicate provided above in (1) in amounts as shown below in Table 2, mixing them uniformly, filling a Styrofoam container (internal volume of 30 cm long, 50 cm wide and 35 cm deep) with the resulting mixture to a height of about 30 cm, and allowing it to stand in a thermostat of 55° C. The time when the mixture was filled in the Styrofoam container was designated as a composting initiation point. By measuring the temperature during composting with the passage of time, the maximum temperature upon composting and time required for attaining the maximum temperature were found. The results are as shown in Table 7.

TABLE 7

| | Organic matter[1] | | | | | Composting state | |
|---|---|---|---|---|---|---|---|
| Test No. | Fowl raw dung (water content: 65%) | Wheat bran | Wheat low-grade flour powder | Corn husk | Saw-dust | Calcium silicate | Maximum Temp. | Time for attaining maximum Temp. |
| 21 | 12 kg | — | — | — | — | 600 g | 10° C. | 145 hrs. |
| 22 | 12 kg | 200 g | — | — | — | 400 g | 19° C. | 120 hrs. |
| 23 | 12 kg | 400 g | — | — | — | 200 g | 45° C. | 115 hrs. |
| 24 | 12 kg | — | 400 g | — | — | 200 g | 38° C. | 135 hrs. |
| 25 | 12 kg | — | — | 400 g | — | 200 g | 34° C. | 140 hrs. |
| 26 | 12 kg | — | — | — | 400 g | 200 g | 13° C. | 160 hrs. |
| 27 | 12 kg | 600 g | — | — | — | — | 20° C. | 160 hrs. |

From the above-described results in Table 7, it has been found that in Test Nos. 3 to 5, wherein the composting was conducted by adding a mixture, which had been obtained by mixing an organic matter (wheat bran, wheat low-grade flour powder or corn husk) having an arabinoxylan content of 10 wt. % or greater and calcium silicate at a weight ratio within the range of 50:50 to 95:5, to a raw material to be composted (fowl raw dung), the maximum temperature became suited for composting, in other words, fell within a range of 30 to 50° C. within 150 hours after the composting was started, indicating that the raw material to be composted was composted smoothly in a short time.

It has been found that in Test No. 21 wherein only calcium silicate was added to the raw material to be composted (fowl raw dung) or Test No. 26 wherein calcium silicate and sawdust having an arabinoxylan content of 5 wt. % were added to the raw material to be composted (fowl raw dung), the maximum temperature reached only 10° C. or 13° C., respectively, indicating that composting was not substantially effected and composting of the raw material to be composted (production of an organic fertilizer) was difficult.

It has also been found that in Test No. 22 wherein calcium silicate and an organic matter (wheat bran) having an arabinoxylan content of 10 wt. % or greater were added to the raw material to be composted (fowl raw dung) but the amount of the organic matter (wheat bran) was less than that of calcium silicate, meaning that their weight ratio was outside the above-specified range of 50:50 to 95:5 of the present invention, and in Test No. 27 wherein not calcium silicate but only wheat bran was added, the maximum temperature upon composting therefore increased only to 19° C., indicating that composting was not conducted smoothly in a short time.

Example 7

(1) A composting accelerator was prepared in advance by mixing wheat bran and calcium silicate, which were similar to those employed in Example 6, at a weight ratio of 2:1.

(2) After the addition of the composting accelerator prepared in (1) to a raw material to be composted (having a water content of 65 wt. %), which had been obtained by mixing fowl dung and bark at a weight ratio of 1:10, at a ratio as shown in Table 8, the resulting mixture was uniformly mixed and composted in a Styrofoam container as in Example 6(2). The temperature during composting was measured with the passage of time to determine the maximum temperature upon composting and time to attain the maximum temperature. The results are as shown in Table 8.

Example 8

(1) A raw material to be composted (having a water content of 64 wt. %) was prepared in advance by mixing sawdust and cattle dung at a weight ratio of 1:2.

(2) A composting accelerator was prepared in advance by mixing the wheat bran (having an arabinoxylan content of 28 wt. %) and calcium silicate, each similar to that used in Example 6, at a weight ratio of 3:1.

(3) An organic fertilizer (having a water content of 45 wt. %) was produced by mixing 54000 kg of the raw material to be composted, which had been prepared in (1), with 2000 kg of the composting accelerator prepared in (2), depositing the resulting mixture in a roof-equipped deposition house having a height of about 5 m, and composting the mixture at room temperature for 30 days while cutting and mixing it once in 5 days.

(4) The germination ratio and growth degree of *Brassica Rapa var. pervidis.* to which the organic fertilizer obtained above in (1) had been applied were measured and evaluated, respectively, in the above-described method. The results are as shown below in Table 9.

Comparative Example 1

(1) An organic fertilizer (having a water content of 60 wt. %) was produced by depositing only the raw material to be composted, which had been prepared in Example 8(1), without adding a composting accelerator, in a roof-equipped deposition house having a height of about 5 m in a similar manner to Example 8(3), and composting it at room temperature for 30 days while cutting and mixing it once in 5 days.

(2) The germination ratio and growth rate of *Brassica Rapa var. pervidis.* to which the organic fertilizer obtained above in (1) had been applied were measured and evaluated, respectively, in the above-described method. The results are as shown below in Table 9.

TABLE 8

| Test No. | Raw material to be composted[1] | Composting accelerator[2] | Composting state | |
|---|---|---|---|---|
| | | | Maximum temperature | Time to attain maximum temperature |
| 28 | 100 parts by weight | 0.3 part by weight | 10° C. | 155 hrs. |
| 29 | 100 parts by weight | 0.5 part by weight | 40° C. | 145 hrs. |
| 30 | 100 parts by weight | 5 parts by weight | 50° C. | 115 hrs. |
| 31 | 100 parts by weight | 10 parts by weight | 46° C. | 120 hrs. |
| 32 | 100 parts by weight | 25 parts by weight | 14° C. | 130 hrs. |

[1] a 1:10 (weight ratio) mixture of fowl dung and bark (said mixture having a water content of 65 wt. %)
[2] a 2:1 (weight ratio) mixture of wheat bran and calcium silicate From the above-described results in Table 8, it has been found that upon composting of the raw material to be composted (fowl raw dung) by adding thereto the organic matter having an arabinoxylan content of 10 wt. % or greater: and calcium silicate, the addition of 0.5 to 20 parts by weight in total of the organic matter and calcium silicate to 100 parts by weight of the raw material to be composted increased the maximum temperature to a range of from 30 to 50° C., suited for composting, with the addition of 5 to 10 parts by weight being particularly preferred.

TABLE 9

| Example | Raw material to be composted[1] | Composting accelerator[2] | Water content | Organic fertilizer Germination rate of Brassica Rapa var. pervidis. | Growth degree of Brassica Rapa var. pervidis. |
|---|---|---|---|---|---|
| Example 8 | 54000 kg | 2000 kg | 45% | 93% | 4.5 |
| Comp. Ex. 1 | 54000 kg | — | 60% | 15% | 2.0 |

[1])A 1:2 (weight ratio) mixture of sawdust and cattle dung
[2])A 3:1 (weight ratio) mixture of wheat bran and calcium silicate From the above-described results in Table 9, it has been found that a fully-matured organic fertilizer excellent in fertilizing efficiency was obtained easily in a short time by adding the composting accelerator of the present invention to the raw material to be composted.

Example 9

(1) A raw material to be composted (having a water content of 45 wt. %) was prepared in advance by mixing activated sludge generated from sewage treatment and composted sludge (returned compost) at a weight ratio of 1:7.

(2) A composting accelerator was prepared in advance by mixing rice bran (having an arabinoxylan content of 23 wt. %) and calcium silicate similar to that employed in Example 1 at a weight ratio of 4:1.

(3) An organic fertilizer (having a water content of 35 wt. %) was produced by mixing 130 t of the raw material to be composted, which had been prepared in (1), with 2 t of the composting accelerator prepared in (2), depositing the resulting mixture (to a height of 3 m), and composting the mixture at room temperature for 28 days while stirring and cutting it once a week.

(4) The germination ratio and growth degree of *Brassica Rapa var. pervidis.* to which the organic fertilizer obtained above in (3) had been applied were measured and evaluated, respectively, by the above-described method. The results are as shown below in Table 5.

Comparative Example 2

(1) An organic fertilizer (having a water content of 40 wt. %) was produced by depositing only the raw material to be composted, which had been prepared in Example 9(1), without adding a composting accelerator, in a similar manner to Example 9(3), and composting it at room temperature for 28 days while cutting and stirring it once a week.

(2) The germination ratio and growth rate of *Brassica Rapa var. pervidis.* to which the organic fertilizer obtained above in (1) had been applied were measured and evaluated, respectively, in the above-described method. The results are as shown below in Table 10.

TABLE 10

| Example | Raw material to be composted[1] | Composting accelerator[2] | Water content | Organic fertilizer Germination rate of Brassica Rapa var. pervidis. | Growth degree of Brassica Rapa var. pervidis. |
|---|---|---|---|---|---|
| Example 9 | 100000 kg | 2000 kg | 35% | 96% | 4.5 |
| Comp. Ex. 2 | 100000 kg | — | 55% | 10% | 1.5 |

[1])A 1:7 (weight ratio) mixture of activated sludge and composted sludge
[2])A 4:1 (weight ratio) mixture of rice bran and calcium silicate From the above-described results in Table 10, it has been found that a fully-matured organic fertilizer excellent in fertilizing efficiency was available easily in a short time by adding the composting accelerator of the present invention to the raw material to be composted, thereby composting the latter.

Capability of Exploitation in Industry

The composting accelerator according to the present invention is markedly effective for the composting of an organic raw material to be composted, particularly that having a high water content and being prone to become hydrophobic, such as livestock excrement, food remnants and activated sludge.

When the composting accelerator (AB) of the present invention is added to such a raw material to be composted, a good-quality organic fertilizer having excellent fertilizing efficiency can be produced easily and smoothly in a short composting time while lessening an emission amount and emission period of ammonia compared with those of the traditional case, only by adding the composting accelerator to the raw material to be composted and composting the latter at room temperature (natural temperature) in the air without adjusting the water content, C/N ratio and pH of the raw material to be composted.

In addition, the composting accelerator (AB) of the present invention can be prepared easily only by mixing wheat bran and/or low-grade flour powder with the above-described heat-resistant bacteria and optionally a humic acid, pH regulator and another component.

Since the composting accelerator (AB) of the present invention has inhibitory action against emission of ammonia, which otherwise occurs by the composting of livestock excrement, and at the same time, is free of a harmful component, spraying of it on the floor of a livestock barn safely and effectively reduces an emission amount of ammonia which is a cause for an offensive odor, thereby improving the environment of the livestock barn.

When the composting accelerator (AC) of the present invention is used, an organic waste matter—such as livestock excrement from animals in a livestock barn, food remnants dumped from food industry or home, activated sludge left after the aeration of the industrial waste in an oxidizing tank or after sewage treatment, or ligneous residues—can be converted into a good-quality organic fertilizer having excellent fertilizing efficiency by composting it in a short time only by simple step and operations without any extra apparatus for bringing it into continuous contact with the air, without adding slaked lime or without adjusting the water content, pH and C/N ratio of the raw material to be composted.

What is claimed is:

1. A composting accelerator, which comprises wheat bran and/or low-grade flour powder having an arabinoxylan content of 10 wt. % or greater, (B) heat-resistant bacteria in an amount of $10^5$ CFU or greater per g of the composting accelerator for assimilating an organic material and (C) calcium silicate, and said composting accelerator has a pH adjusted within a range of from 6.0 to 8.5.

2. A composting accelerator according to claim 1, which contains the component (A) in an amount of 60 wt. % or greater based on the total weight of the composting accelerator.

3. A composting accelerator according to claim 1, wherein the heat-resistant bacteria (B) are able to survive at 55° C. after treated at 80° C. for 10 minutes.

4. A composting accelerator according to claim 1, further comprising a humic acid in an amount of 2.5 wt. % or less based on the total weight of the composting accelerator.

5. A method comprising spraying a composting accelerator as claimed in claim 1 to the floor of a livestock barn.

6. A process for producing an organic fertilizer, which comprises adding, to 100 parts by weight, in terms of a dry matter, of a raw material to be composted, a composting accelerator as claimed in claim 1 in an amount so that the component (A) in the composting accelerator is 0.2 to 25 parts by weight, in terms of a dry matter, and conducting composting.

7. An organic fertilizer obtained by the process as claimed in claim 6.

8. A method for spraying an organic fertilizer as claimed in claim 7 to the floor of a livestock barn.

9. A composting accelerator comprising a mixture obtained by mixing (A) an organic matter having an arabinoxylan content of 10 wt. % or greater and (C) calcium silicate at a weight ratio ranging from 50:50 to 95:5.

10. A process for producing an organic fertilizer, which comprises adding, to a raw material to be composted, (A) an organic matter having an arabinoxylan content of 10 wt. % or greater and (C) calcium silicate at a weight ratio of (A):(C) ranging from 50:50 to 95:5 and composting said raw material.

11. A process according to claim 10, wherein the component (A) and component (C) are added in a total amount of 0.5 to 20 parts by weight to 100 parts by weight of the raw material to be composted.

12. An organic fertilizer produced by the process as claimed in claim 10 or 11.

* * * * *